(12) United States Patent
Son et al.

(10) Patent No.: US 9,310,898 B2
(45) Date of Patent: Apr. 12, 2016

(54) METHOD OF CONTROLLING TOUCH SCREEN WITH INPUT PEN AND ELECTRONIC DEVICE THEREOF

(71) Applicant: Samsung Electronics Co., Ltd., Gyeonggi-do (KR)

(72) Inventors: Sung-Ho Son, Daegu (KR); Myung-Su Kang, Seoul (KR); Keum-Ju Jang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 32 days.

(21) Appl. No.: 14/230,292

(22) Filed: Mar. 31, 2014

(65) Prior Publication Data

US 2014/0292696 A1 Oct. 2, 2014

(30) Foreign Application Priority Data

Apr. 2, 2013 (KR) .................. 10-2013-0035995
Mar. 12, 2014 (KR) .................. 10-2014-0029035

(51) Int. Cl.
| | |
|---|---|
| *G06F 3/0354* | (2013.01) |
| *G06F 3/041* | (2006.01) |
| *G06F 1/32* | (2006.01) |
| *G06F 3/046* | (2006.01) |
| *G06F 3/0481* | (2013.01) |
| *G06F 3/0488* | (2013.01) |

(52) U.S. Cl.
CPC .......... *G06F 3/03545* (2013.01); *G06F 1/3206* (2013.01); *G06F 1/3262* (2013.01); *G06F 1/3265* (2013.01); *G06F 3/041* (2013.01); *G06F 3/046* (2013.01); *G06F 3/0481* (2013.01); *G06F 3/04883* (2013.01); *Y02B 60/1242* (2013.01)

(58) Field of Classification Search
CPC ... G06F 1/3206; G06F 1/3262; G06F 1/3265; G06F 3/03545; G06F 3/041; G06F 3/046; G06F 3/0481; G06F 3/04883; Y02B 60/1242
USPC .......................................... 345/173, 174, 179
See application file for complete search history.

(56) References Cited

U.S. PATENT DOCUMENTS

| | | | |
|---|---|---|---|
| 5,428,805 A * | 6/1995 | Morgan | G06F 3/04883 345/173 |
| 6,445,383 B1 | 9/2002 | Chambers et al. | |
| 8,638,303 B2 * | 1/2014 | Harris et al. | 345/173 |
| 2007/0188477 A1 * | 8/2007 | Rehm | 345/179 |
| 2012/0194457 A1 | 8/2012 | Cannon et al. | |
| 2013/0009907 A1 * | 1/2013 | Rosenberg et al. | 345/174 |

(Continued)

FOREIGN PATENT DOCUMENTS

| | | | |
|---|---|---|---|
| CN | 101387904 A * | 3/2009 | G06F 1/32 |
| KR | 10-2012-0038391 A | 4/2012 | |
| WO | 99/47990 A1 | 9/1999 | |

OTHER PUBLICATIONS

EPO Examination Report for U.S. Appl. No. 14/62589.7-1959 (Jul. 28, 2015) With Examined Claims.

*Primary Examiner* — Larry Sternbane
(74) *Attorney, Agent, or Firm* — Cha & Reiter, LLC

(57) ABSTRACT

A method of an electronic device is provided according to various example embodiments of the present invention. The method includes confirming state information of an input pen placed on a touch screen, and performing at least one function corresponding to the confirmed state information.

20 Claims, 15 Drawing Sheets

(56) References Cited

U.S. PATENT DOCUMENTS

2013/0106724 A1* 5/2013 Pedersen et al. .............. 345/173
2014/0125637 A1* 5/2014 Bang et al. .................... 345/179
2014/0146003 A1* 5/2014 Jang et al. .................... 345/174

* cited by examiner

METHOD OF CONTROLLING TOUCH SCREEN WITH INPUT PEN AND ELECTRONIC DEVICE THEREOF

CROSS REFERENCE TO RELATED APPLICATION

This application claims the benefit under 35 U.S.C. §119 (a) of a Korean patent application filed in the Korean Intellectual Property Office on Apr. 2, 2013 and assigned Serial No. 10-2013-0035995 and a Korean patent application filed in the Korean Intellectual Property Office on Mar. 12, 2014 and assigned Serial No. 10-2014-0029035, the entire disclosures of which are hereby incorporated by reference.

BACKGROUND

1. Technical Field

The present disclosure relates to computer graphics processing and selective visual display systems, and, more particularly, to touch panels.

2. Background

With a rapid development in electronic communication techniques, various electronic devices have been widely distributed in recent years. To cope with user demand, the electronic device has gradually become increasingly small, light, thin, and simple, and functions thereof have become more diversified.

Examples of the electronic device can include a mobile phone such as a smart phone, a mobile pad, a media player, a tablet computer, a handheld computers, a Personal Digital Assistant (PDA), etc.

A peripheral device attached or added to the electronic device has also been under development in accordance with the rapid development of the electronic communication techniques. Examples of the peripheral device include an auxiliary memory card, an ear microphone installed to the electronic device to communicate with a peer user, a Bluetooth headset mounted on the electronic device to perform near field communication by the use of a Bluetooth module, and an input pen for facilitating a manipulation of a touch screen in which an input and an output are simultaneously performed.

A so-called smart phone is one such representative portable electronic device. The smart phone generally incorporates a touch screen in which an input and an output are simultaneously performed on a large screen, and is highly convenient to use.

A touch panel used in the touch screen may be implemented as a resistive-type touch panel, a capacitive-type touch panel, an ultrasonic wave-type touch panel, an optical (infrared) sensor-type touch panel, a touch panel using an electromagnetic resonance, etc.

An electronic device having the aforementioned various types of touch screen can have a specific-length input pen having a tip, of which an end portion is sharp, and attachable/detachable to the electronic device to increase convenience and variety of touch.

SUMMARY

A method of controlling a touch screen and an electronic device thereof is disclosed herein.

Another aspect of the present invention is to provide a method which prevents an input pen from being lost due to negligence when the pen needs to be put down for a moment while using the input pen, and by which an action for turning off a screen is not required, thereby providing convenience in use.

Another aspect of the present invention is to provide a method of controlling a touch screen for performing at least one function based on an angle at which an input pen stands upright on a surface of the touch screen in an electronic device, and the electronic device thereof.

Another aspect of the present invention is to provide a method of controlling a touch screen capable of reconfiguring at least one user interface based on a state where an input pen is placed on the touch screen in an electronic device, and the electronic device thereof.

In accordance with an aspect of the present invention, a method of controlling an electronic device is provided. The method includes confirming state information of an input pen placed on a touch screen, and performing at least one function corresponding to the confirmed state information.

In accordance with another aspect of the present invention, an electronic device is provided. The electronic device includes an input pen, a touch screen, and at least one processor for confirming information on a state where the input pen is placed on the touch screen and for performing at least one function corresponding to the confirmed state information.

BRIEF DESCRIPTION OF THE DRAWINGS

The above and other aspects, features and advantages of certain example embodiments will be more apparent from the following detailed description taken in conjunction with the accompanying drawings, in which.

DETAILED DESCRIPTION

Figure 1:
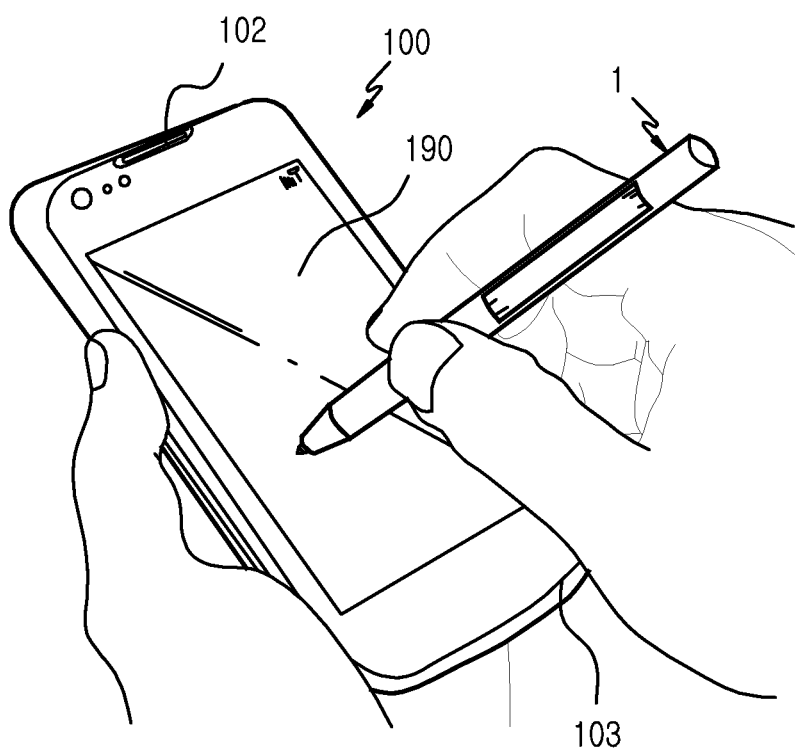
FIG. 1 is a perspective illustration of example manipulation of an input pen in an electronic device according to various example embodiments.

While the present invention is susceptible to various modifications and alternative forms, one or more example embodiments thereof has been shown by way of example in the drawings and will herein be described in detail. It should be understood, however, that it is not intended to limit the invention to the particular form disclosed, but, on the contrary, the intention is to cover all modifications, equivalent, and alternatives falling within the disclosure of invention as defined by the appended claims.

It will be understood that although the terms "first" and "second" are used herein to describe various elements, these elements should not be limited by these terms. These terms are only used to distinguish one element from another element. For example, a first component may be termed a second component, and similarly, the second component may be termed the first component without departing from the scope of the present invention.

The terminology used herein is for the purpose of describing particular example embodiments only and is not intended to be limiting of the invention. A singular expression includes a plural concept unless there is a contextually distinctive difference therebetween. In this description, the term "include" or "have" is intended to indicate that characteristics, numbers, steps, operations, components, elements, etc. disclosed in the specification or combinations thereof exist. As such, the term "include" or "have" should be understood that there are additional possibilities of one or more other characteristics, numbers, steps, operations, components, elements or combinations thereof.

Hereinafter, the present invention will be described in detail with reference to accompanying drawings according to various example embodiments. In the following discussion, many specific details are provided to set forth a thorough understanding of the present invention. It will be obvious, however, such specific details are exemplified for description purposes, and thus the present invention is not limited thereto. In addition, known elements have not been illustrated in order to not obscure the present invention in unnecessary detail.

Although a communication portable terminal having a touch screen is illustrated and described as an electronic device according to various exemplary embodiments of the present invention, the present invention is not limited thereto. Various devices having a touch screen can be used as the electronic device, for example, a Personal Digital Assistant (PDA), a laptop computer, a smart phone, a netbook, a Mobile Internet Device (MID), a Ultra Mobile Personal Computer (UMPC), a Tablet Personal Computer (TPC), a navigator, an Motion Picture Experts Group Layer 3 (MP3) player, etc.

Hereinafter, a method and apparatus for controlling a touch screen and an electronic device thereof will be described according to various example embodiments of the present invention.

FIG. 1 is a perspective illustration of example manipulation of an input pen with an electronic device according to various example embodiments Referring to FIG. 1, an electronic device 100 includes a touch screen 190 in a front surface thereof. A speaker 102 can be disposed to an upper portion thereof, and a microphone 103 can be disposed to a lower portion thereof.

According to various exemplary embodiments, a metal member made of an ferrite material can be attached to the electronic device 100 or a magnet can be attached thereto, thereby being enable to magnetic securing of an input pen 1.

As will be described below, the touch screen 190 of the electronic device 100 can include a touch panel (see 192 of FIG. 4) for recognizing a touch made by a human body part of a user, e.g., a finger or a palm, and a pen touch panel (see 193 of FIG. 4) for detecting an input of the input pen 1.

Preferably, the touch panel 192 may be a touch panel for recognizing an input of data when a user's finger is directly in contact with a surface of the touch screen 190 according to a capacitive-type or a resistive-type.

More preferably, the pen touch panel 193 may be an electromagnetic induction-type touch panel which can detect an approach of the input pen 1 when the input pen 1 approaches within a specific distance before being in contact with the touch screen 190. The touch panel 192 may alternatively be a space touch panel such as an acoustic wave-type touch panel or an infrared-type touch panel.

According to example embodiments, a capacitive-type touch panel can be used as the touch panel 192 for recognizing a contact of a human body part of a user, e.g., a finger or a palm, and an electromagnetic induction-type digitizer plane can be applied as the pen touch panel 193.

In addition, when the user moves the input pen 1 close to a sensing area without being in contact with the touch screen 190, a function of the touch panel 192 for detecting the human body part can be released to exclude an input error caused by a finger touch of the user. Therefore, when the user uses the input pen 1, a data input error caused by the touch of the human body part can be prevented even if the palm is disposed over the touch screen 190.

Figure 2:
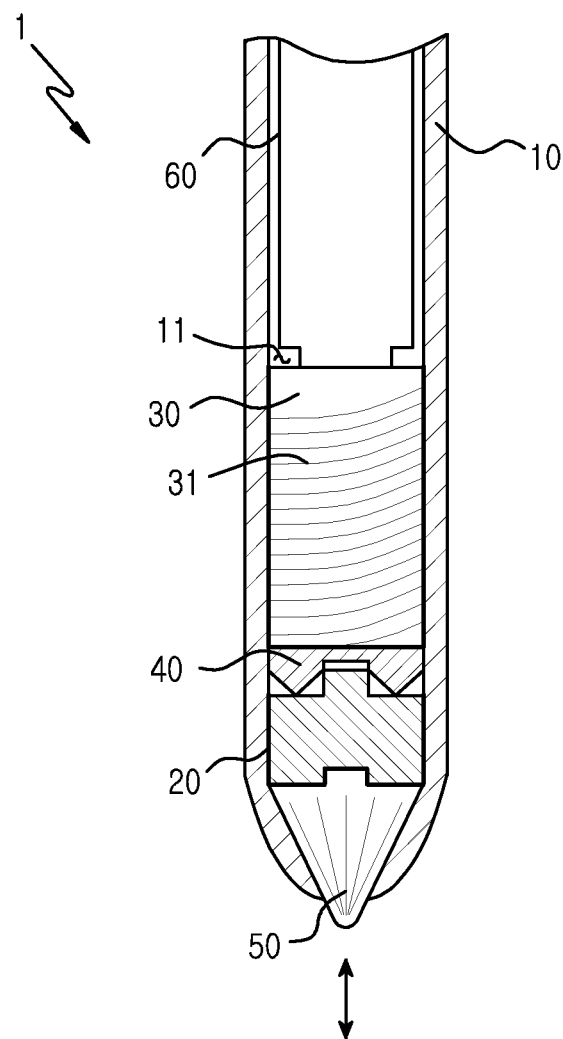
FIG. 2 is a cross-section illustration of a structure of an example input pen according to various example embodiments.

FIG. 2 is a cross-section illustration of a structure of an example input pen according to various example embodiments.

Referring to FIG. 2, an input pen 1 can include a hollow housing 10 having a specific length, a tip 50 which can be installed to an inner space 11 of the housing 10 in a movable manner and of which one end is exposed to the housing 10, a magnetic member 20 which moves together with the tip 50, a coil member 30 separated by a specific interval from the magnetic member 20, a board 60 having an oscillation circuit which leads to an inductance change according to an interval change with respect to the coil member 30 caused by the movement of the magnetic member 20, and an elastic member 40 which is transformed when the tip 50 is pressed while maintaining an interval between the magnetic member 20 and the coil member 30 and thus leads to a change in the interval between the magnetic member 20 and the coil member 30.

According to various exemplary embodiments of the present invention, the input pen 1 can have a metal member or a magnet. For example, the input pen 1 can include a gyro sensor and/or a geomagnetic sensor.

The tip 50 can be formed such that one portion thereof protrudes at an opening hole formed at an end portion of the housing 10, and the magnetic member 20 can be placed on a mounting surface which does not protrude. In this case, a protrusion can be formed on the mounting surface of the tip 50 and can be joined to a concave groove formed on a lower surface of the magnetic member 20. Thus, the magnetic member 20 can be guided to move together with the tip 50.

Preferably, a ferrite chip can be used as the magnetic member 20. A guide protrusion is formed on an upper surface of the magnetic member 20 in a protrusion manner, and can be configured to be placed in a guide groove formed on the specific elastic member 40. The coil member 30 can have a coil 31 which is wound several times on an outer circumferential surface of a bar-shaped ferrite core. In addition, the coil member 30 can be closely fixed on the board 60 fixed not to move in the inner space 11 of the housing 10.

Therefore, the elastic member 40 can be disposed between the magnetic member 20 and the coil member 30. The elastic member 40 is separated by a specific interval so that the magnetic member 20 and the coil member 30 are not in contact with each other, and supports the magnetic member 20 which is pulled in a direction of the coil member 30 by the tip 50. When a force (i.e., a pen pressure) exerted on the tip 50 is removed, a restoring force can be provided so that the magnetic member 20 maintains an original interval from the coil member 30. The elastic member 40 can use a material (e.g., rubber, silicon, etc.) capable of maintaining an original shape even after a long time of use.

Figure 3:
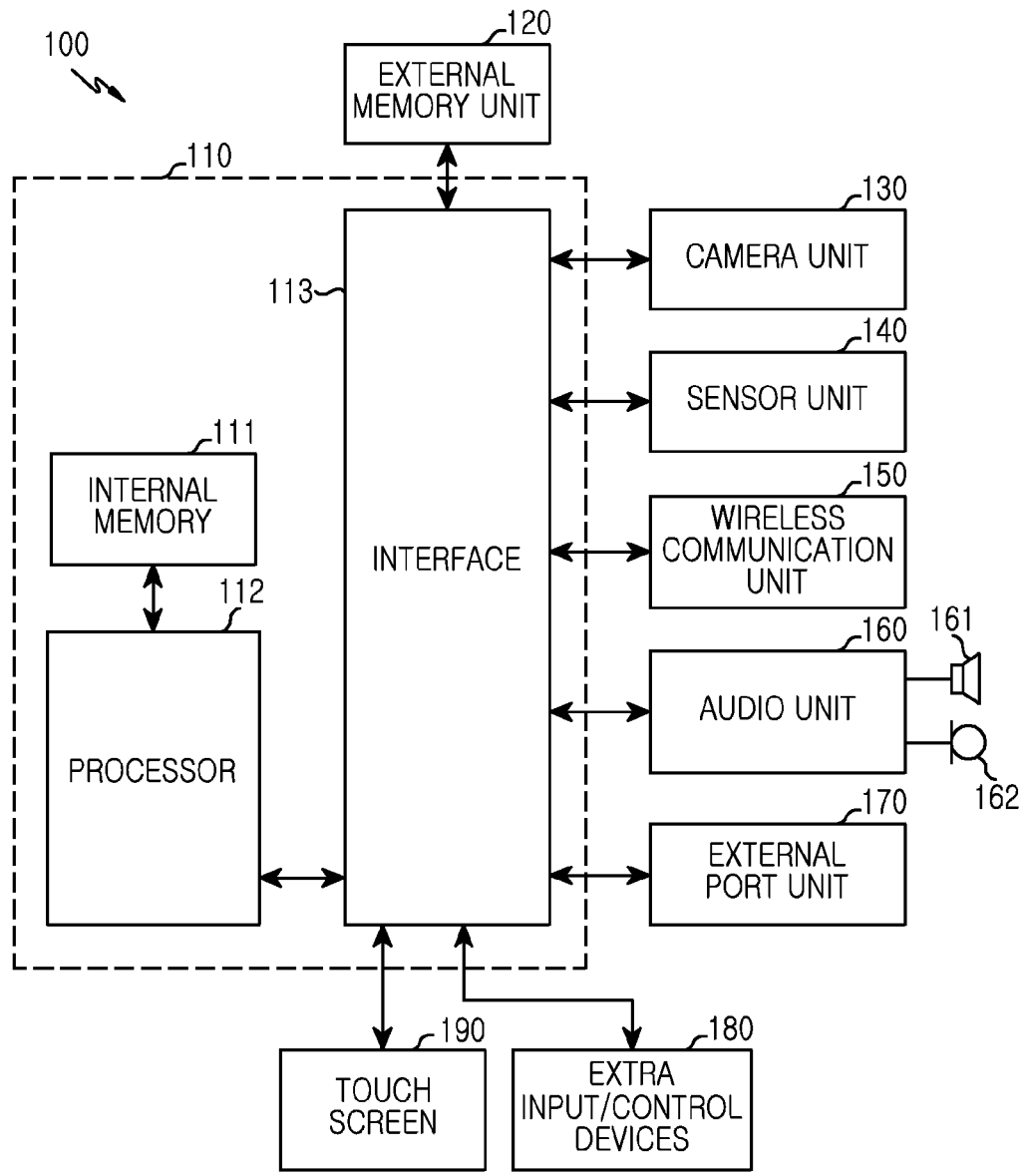
FIG. 3 is a block diagram illustration of an electronic device according to various example embodiments.

FIG. 3 is a block diagram illustration of an electronic device according to various example embodiments.

Referring to FIG. 3, an electronic device 100 can include a host unit 110, an external memory unit 120, a camera unit 130, a sensor unit 140, a wireless communication unit 150, an audio unit 160, an external port unit 170, a touch screen 190, and extra input/control devices 180. The external memory unit 120 and the external port unit 170 may be plural in number.

The host unit 110 includes an internal memory 111, at least one processor 112, and an interface 113. The internal memory 111, the at least one processor 112, and the interface 113 may be separate components or may be configured in one or more Integrated Circuits (ICs).

The processor 112 performs several functions for the electronic device 100 by executing various software programs, and also processes and controls voice communication, video communication, and data communication. Further, in addition to the typical function, the processor 112 can execute a software program (or an instruction set) stored in the internal memory 111 and/or the external memory unit 120 and thus perform various functions corresponding to the program.

In one embodiment, the processor 112 can regulate brightness of a screen on the basis of an angle between the input pen 1 and the touch screen 190. According to one exemplary embodiment, the angle may be an angle at which the input pen 1 stands upright on the touch screen 190. According to one exemplary embodiment, the processor 112 can set the brightness of the screen such that the brightness becomes darker gradually as the angle between the input pen 1 and the touch screen 190 becomes smaller. The processor 112 can set the brightness of the screen to be the darkest when the input pen 1 is placed on the touch screen 190. However, the present invention is not limited thereto, and thus can also be applied to the opposite case.

In one embodiment, the processor 112 can change state information of the electronic device 100 on the basis of a state of moving from a state where the input pen 1 is placed on the touch screen 190 (i.e., a state where the input pen is completely laid on a surface of the touch screen). According to one exemplary embodiment, the processor 112 can regulate the brightness of the screen on the basis of a direction in which the input pen 1 rotates on the surface of the touch screen 190. According to one exemplary embodiment, the processor 112 can provide control such that the brightness of the screen becomes gradually brighter or gradually darker when the input pen 1 rotates in a clockwise direction. According to one exemplary embodiment, the processor 112 may provide control such that the brightness of the screen becomes gradually brighter or gradually darker when the input pen 1 rotates in a counter-clockwise direction. However, the present invention is not limited thereto, and thus various functions of the electronic device 100 can also be controlled on the basis of a rotation of the input pen 1. According to one exemplary embodiment, the function may include at least one of controlling of screen brightness, controlling of a volume, reconfiguring of a user interface, driving of an application, and starting of various events.

In one embodiment, the processor 112 can turn OFF at least some areas of the screen on the basis of a location at which the input pen 1 is placed on the touch screen 190. According to one exemplary embodiment, the processor 112 can deactivate the at least some areas of the screen on the basis of the location at which the input pen 1 is placed on the touch screen 190. The processor 112 can turn OFF or deactivate at least some pre-set areas of the screen irrespective of the location at which the input pen 1 is placed on the touch screen 190, or can turn OFF or deactivate at least some designated areas of the screen on the basis of the location at which the input pen 1 is placed. According to one exemplary embodiment, the processor 112 can ignore or deactivate an input on at least some areas of the touch screen 190 on the basis of the location at which the input pen 1 is placed.

In one embodiment, the processor 112 can reconfigure at least one User interface (UI) which appears on the screen on the basis of the location at which the input pen 1 is placed on the touch screen 190. For example, the processor 112 can hide a pre-set UI of the screen irrespective of the location at which the input pen 1 is placed on the touch screen 190, and can hide a designated UI of the screen on the basis of the location at which the input pen 1 is placed. In addition, when the input pen 1 is placed on the touch screen 190, the processor 112 can hide user information such as a memo, a contact, a message, etc., which appears on the screen, so that the user information is not exposed. According to one exemplary embodiment, when the input pen is placed on the touch screen 190, the processor 112 can rearrange a location of the UI so that the displayed UI is not hidden by the input pen 1.

For example, the processor 112 can perform the method according to various exemplary embodiments of the present invention by interworking with the software programs stored in the internal memory 111 and/or the external memory unit 120.

According to various exemplary embodiments, the processor 112 can power off the touch screen 190 or transition to a locking state if at least one part of the input pen 1 is placed on the touch screen 190.

In addition, the processor 112 can include one or more data processors, an image processor, or a codec. Further, the electronic device 100 can separately configure the data processor, the image processor, or the codec.

The interface 113 connects the host unit 110 to several units of the electronic device 100.

The camera unit 130 can perform a camera function such as photographing, video clip recoding, etc. The camera unit 130 includes a Charge Coupled Device (CCD), a Complementary Metal-Oxide-Semiconductor (CMOS), etc.

In addition, the camera unit 130 can adjust a change in a hardware configuration, e.g., a lens movement, an aperture number, etc., according to a camera program executed by the processor 112.

Various components of the electronic device 100 can be connected through one or more communication buses (their reference numbers are not shown) or electrical connection means (their reference numbers are not shown).

The sensor unit 140 can be disposed to an upper portion of the electronic device 100, and can detect the input pen 1. According to various exemplary embodiments, the sensor unit 140 may be a sensor unit having an element in which voltage is changed depending on a magnetic field's strength. For example, when a magnetic field is generated in a direction perpendicular to a direction of current in a state where the current flows through a conductor, a potential difference (or a magnetic field) is generated in a direction perpendicular to the current in the conductor through which the current flows, and the sensor unit can detect voltage at this moment and can output it as an electric signal.

According to various exemplary embodiments, the sensor unit 140 may be a proximity sensor instead of a sensor unit. For example, when an object is detected while a sinusoidal high frequency is oscillated in an oscillation circuit, the proximity sensor can detect the object according to a principle in which oscillation amplitude of the oscillation circuit is attenuated or suppressed.

The wireless communication unit 150 enables wireless communication, and can include a radio frequency transmitter/receiver and an optical (e.g., infrared) transmitter/receiver. The wireless communication unit 150 can be designed to operate by using one of a Global System for Mobile communications (GSM) network, an Enhanced Data rates for GSM Evolution (EDGE) network, a Code Division Multiple Access (CDMA) network, a Wideband-CDMA (W-CDMA) network, a Long Term Evolution (LTE) network, an Orthogonal Frequency Division Multiple Access (OFDMA) network, a Wi-Fi network, a WiMax network, and/or a Bluetooth network according to a communication network.

The audio unit 160 is connected to a speaker 161 and a microphone 162, and performs an audio input and output function of voice recognition, voice recording, digital recording, telephony, etc.

In addition, the audio unit 160 receives a data signal from the host unit 110, converts the received data signal into an electronic signal, and outputs the converted electronic signal via the speaker 161.

The speaker 161 outputs the electronic signal by converting the signal into an audible frequency band, and is disposed to a rear portion of the electronic device 100. The speaker 161 can include a flexible film in which at least one piezoelectric member is attached to one oscillation film.

The microphone 162 can convert an acoustic wave delivered from a person or other sound sources into an electronic signal. In addition, the audio unit 160 receives an electronic signal from the microphone 162, converts the received electronic signal into an audio data signal, and transmits the converted audio data signal to the host unit 110. The audio unit 160 can include an earphone, headphone, or headset attachable to or detachable from the electric device 100.

The external port unit 170 connects the electronic device 100 directly to another electronic device, or connects the electronic device 100 indirectly to another electronic device via a network (e.g., an Internet, an intranet, a wireless Local Area Network (LAN), etc.). The external port unit 170 can include a node unit disposed to a rear portion of the electronic device 100.

The touch screen 190 can display a signal delivered from the host unit 110 as an image (e.g., text, graphic, video, etc.). In addition, the touch screen 190 is disposed to a front portion of the electronic device 100. The touch screen 190 may include a window (see 191 of FIG. 4), a display (see 194 of FIG. 4), a touch panel 192, and a pen touch panel 193.

The window 191 is exposed to the front portion of the electronic device 100. An image can be reflected through the window 191. The display 194 can include at least one of a Liquid Crystal Display (LCD), an Organic Light Emitting Diode (OLED), an Active Matrix Organic Emitting Diode (AMOLED), a flexible display, and a 3 Dimensional (3D) display.

The touch panel 192 (of FIG. 4) may be a transparent switch panel laminated on the window 191. For example, the touch panel 192 may be a touch panel for recognizing an input of data when a user's finger is directly in contact with a surface of the touch screen 190 according to a capacitive-type or a resistive-type.

The pen touch panel 193 (of FIG. 4) may be an electromagnetic induction-type touch panel which can detect an approach of the input pen 1 when the input pen approaches within a specific distance before being in contact with the touch screen 190 or may be a space touch panel such as an acoustic wave-type touch panel or an infrared-type touch panel.

In case of the electromagnetic induction-type pen touch panel, a plurality of coils can be orthogonally disposed in addition to the touch panel 192 of the electronic device 100. Such a pen touch panel 193 is called a digitizer panel, and can include a sensing means different from the touch panel 192.

The other input/control units 180 can include an up/down button for a volume control. In addition thereto, the other input/control units 180 can include at least one of pointer units such as a push button, a locker button, a locker switch, a thumb-wheel, a dial, a stick, a stylus, etc., to which corresponding functions are assigned.

The external memory unit 120 includes a fast random access memory such as one or more magnetic disc storage devices and/or a non-volatile memory, one or more optical storage devices, and/or a flash memory (e.g., NAND, NOR).

The external memory unit 120 stores a software component. The software component includes an operating system program, a touch operation program, a communication program, a graphic program, a user interface program, a codec program, a camera program, and one or more application programs. The terminology of "program" is also expressed as a set of instructions or an instruction set or a module.

The operating system program is a built-in operating system such as WINDOWS, LINUX, Darwin, RTXC, UNIX, OS X, or VxWorks, and includes various software components for controlling a general system operation. The control of the general system operation includes memory management and control, storage hardware (device) control and management, power control and management, etc. In addition, the operating system program performs a function for facilitating communication between various hardware components (devices) and software components (programs).

The touch operation program can include not only a software component for correcting a touch error recognized by a touch panel IC and a pen touch panel IC but also various routines for supporting a touch panel operation according to the present invention. For example, the touch operation program can include a routine for supporting an activation of the touch panel 192 (of FIG. 4) and the pen touch panel 193 and a routine for collecting a pen touch event and a finger touch event based on a finger, etc., in an activation operation of the touch panel 192 and the pen touch panel 193.

Further, the touch operation program can include a routine for supporting a classification of types of input touch events by confirming device information of the touch panel 192 and device information of the input pen 1 based on a digitizer corresponding to the pen touch panel 193. In addition, the aforementioned touch operation program can include a routine for identifying a collected human body touch event based on a user and a pen touch event and a routine for operating the identified touch events in reference to a specific touch operation table.

The communication program can enable communication with a peer electronic device such as a computer, a server, an electronic device, etc., via the wireless communication unit 150 or the external port unit 170.

The graphic program includes various software components for providing and displaying graphics on the touch screen 190. The terminology of "graphics" indicates a text, a web page, an icon, a digital image, a video, an animation, etc.

The user interface program includes various software components related to a user interface. In addition, the user interface program includes the content related to how a state of the user interface changes and in which condition the state of the user interface changes.

The codec program includes a software component related to encoding and decoding of a video file.

The camera program includes a camera-related software component which enables camera-related processes and functions.

The application program includes a browser, an e-mail, an instant message, word processing, keyboard emulation, an address book, a contact list, a widget, a Digital Right Management (DRM), voice recognition, voice recording, a location determination function, a location-based service, etc.

In addition to the aforementioned programs, the host unit 110 can further include additional programs (or instructions). In addition, various functions of the electronic device 100 of the present invention can be performed by using at least one stream processing and/or a hardware component including an Application Specific Integrated Circuit (ASIC) and/or a software component and/or a combination thereof.

Figure 4:
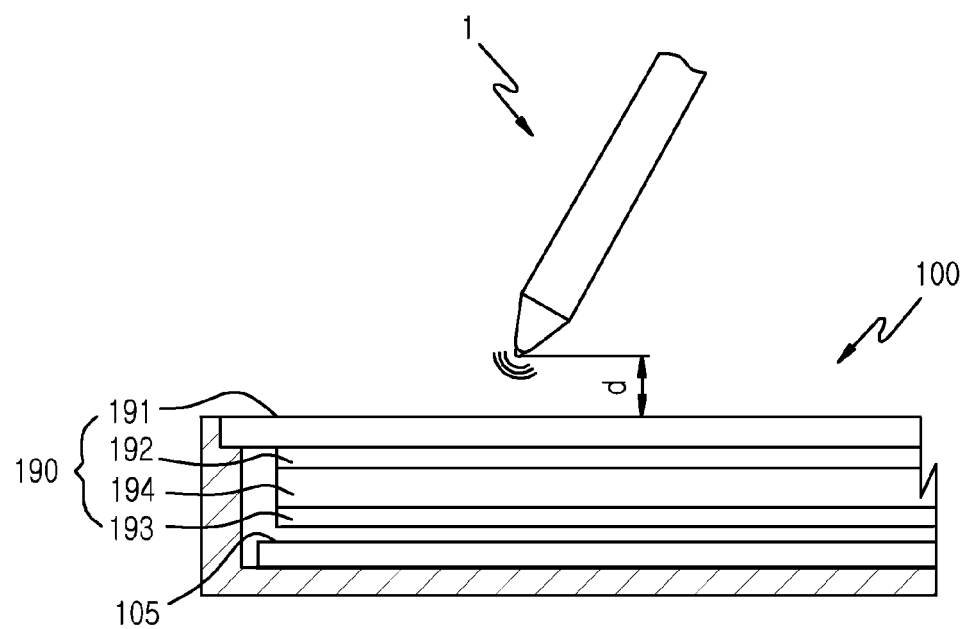
FIG. 4 is a cross-section illustration of an input pen applied to an electronic device according to various example embodiments.

FIG. 4 is a cross-section illustration of an input pen applied to an electronic device according to various example embodiment.

Referring to FIG. 4, an electronic device 100 includes a touch screen 190 configured by sequentially mounting a window 191, a touch panel 192, a display 194, and a pen touch panel 193 in an inner mounting space of a specific case frame. The transparent touch panel 192 can be mounted on a lower surface of the window 191 of the electronic device 100 in a deposited manner, and the display 194 such as LCD can be mounted on a lower portion thereof.

Although not shown, the pen touch panel 193 can include a sensor in which a plurality of X-axis coil arrays and Y-axis coil arrays are orthogonally disposed, a shield plate installed to a lower portion of the sensor to shield an external electromagnetic wave, and a connector electrically coupled to a main board 105 of the electronic device 100. The sensor may be implemented in a printed circuit board (PCB). In addition, the pen touch panel 193 is preferably disposed to a lower portion of the additional touch panel 192 formed of a transparent material and the display 194 since a light-proof coil is included.

In one embodiment, an alternating current signal is applied to a coil formed on a sensing pad of the pen touch panel 193, and when the input pen 1 approaches within a specific distance D in the touch screen 190, a coil of the pen touch panel 193 adjacent to the input pen 1 can generate a magnetic field. In addition, an oscillation frequency is generated in oscillation with the generated magnetic field in the input pen 1, and the generated oscillation frequency is detected by the processor 112 of the electronic device 100 and thus a corresponding touch location can be recognized.

Figure 5A:
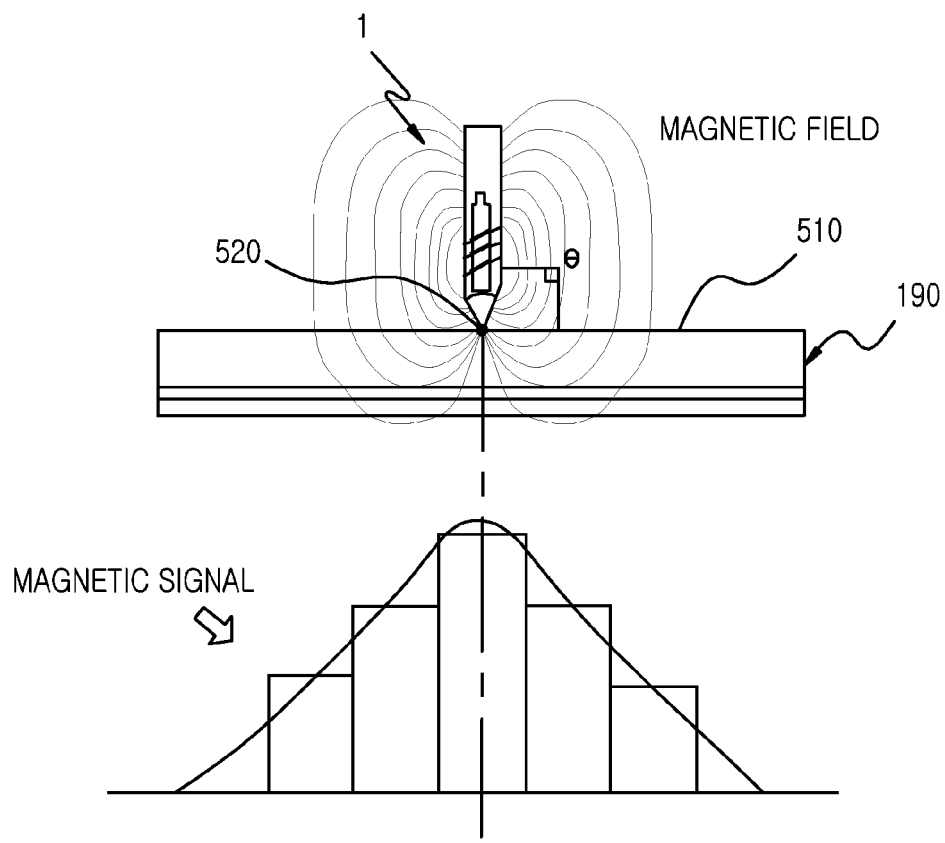
FIG. 5A is an illustration of changes in a magnetic signal on the basis of an angle between an input pen and a first surface of an electronic device according to various example embodiments.
Figure 5B:
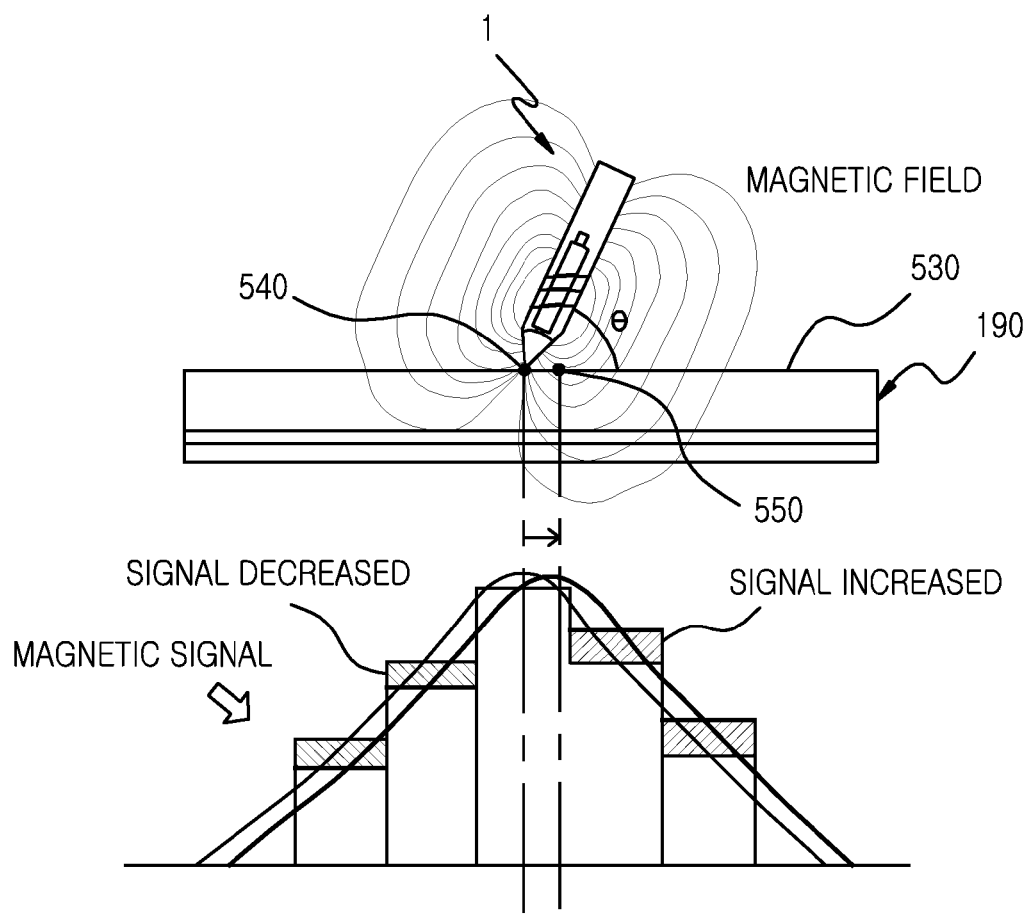
FIG. 5B is an illustration of changes in a magnetic signal on the basis of an angle between an input pen and a first surface of an electronic device according to various example embodiments.

FIG. 5A and FIG. 5B illustrate a change in a magnetic signal on the basis of an angle between an input pen and a first surface of an electronic device according to various exemplary embodiments of the present invention.

Referring to FIG. 5A and FIG. 5B illustrate of changes in a magnetic signal on the basis of an angle between an input pen and a first surface of an electronic device according to various example embodiments Referring now to FIG. 5A, according to example embodiment, the aforementioned magnetic signal's strength change can be detected according to an angle θ between the input pen 1 and a first surface 510 of the electronic device 100. For example, if the angle θ between the input pen 1 and the first surface 510 of the electronic device 100 is 90°, the magnetic signal's strength can be output as illustrated. For example, the magnetic force's strength recognized by the electronic device 100 may be bilaterally symmetrical about a touch recognition point 520 of the input pen 1.

As illustrated in FIG. 5B, if the angle θ between the input pen 1 and a first surface 530 of the electronic device 100 is less than 90°, a magnetic signal's strength can be output as illustrated since the magnetic force's strength recognized by the electronic device 100 is changed. For example, a touch recognition point 540 of the input pen 1 may shift to the right and thus change to a new touch recognition point 550, and a change in the magnetic force's strength can be detected in the electronic device 100. By using the magnetic force's strength change, an angle between the input pen 1 and the first surface 530 of the electronic device 100 can be determined.

In one embodiment, if the angle θ between the input pen 1 and the first surface 530 of the electronic device 100 is less than a specific angle according to the aforementioned principle, the electronic device 100 can power off the touch screen 190 or can operate a corresponding function, for example, for transitioning the touch screen 190 to a locking state.

In one embodiment, the electronic device 100 can regulate brightness of the screen on the basis of an angle θ between the input pen 1 and a first surface 530. The electronic device 100 can set the brightness of the screen such that the brightness becomes darker gradually as the angle θ between the input pen 1 and the first surface 530 becomes smaller. For example, the electronic device 100 can set the brightness of the screen to be the darkest when the input pen 1 is placed on the first surface 530.

In one embodiment, the electronic device 100 can turn OFF a portion of the screen on the basis of a location at which the input pen 1 is placed on the first surface 530. For example, the electronic device 100 can turn OFF a pre-set portion of the screen irrespective of the location at which the input pen 1 is placed on the first surface 530, and can turn OFF a designated portion of the screen on the basis of the location at which the input pen 1 is placed.

In one embodiment, the electronic device 100 can hide at least one UI which appears on the screen on the basis of the location at which the input pen 1 is placed on the first surface 530. For example, the electronic device 100 can hide a pre-set UI of the screen irrespective of the location at which the input pen 1 is placed on the first surface 530, and can hide a designated UI of the screen on the basis of the location at which the input pen 1 is placed. In addition, when the input pen 1 is placed on the first surface 530, the electronic device 100 can hide user information such as a memo, a contact, a message, etc., which appears on the screen, so that the user information is not exposed.

Figure 6:
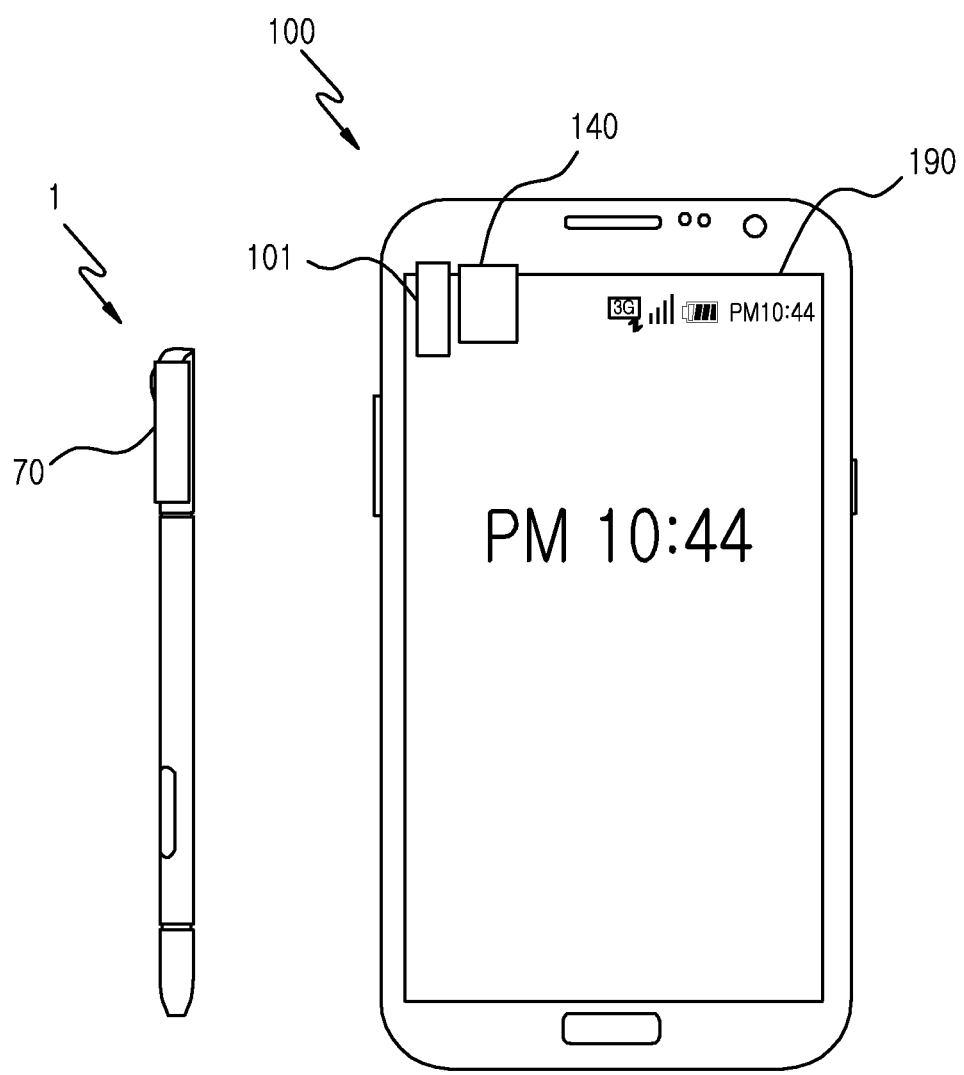
FIG. 6 is a perspective view of an electronic device and an input pen according to various example embodiments.

FIG. 6 is a perspective view of an electronic device and an input pen according to various example embodiments Referring to FIG. 6, according to various exemplary embodiments, an electronic device 100 can have a magnet or metal member, and an input pen 1 can have a metal member, or a magnet, respectively. The metal member and the magnet can be magnetically coupled, securing the input pen 1 to the electronic device 100.

According to some example embodiments, a metal member 101 and a sensor unit 140 can be provided to an upper portion of the electronic device 100, and preferably can be disposed to a boundary of the electronic device 100. The metal member 101 can be made of a ferrite material, and the metal member 101 and the touch pen 1 can be attached by using a magnet 70 of the input pen 1.

Figure 7A:
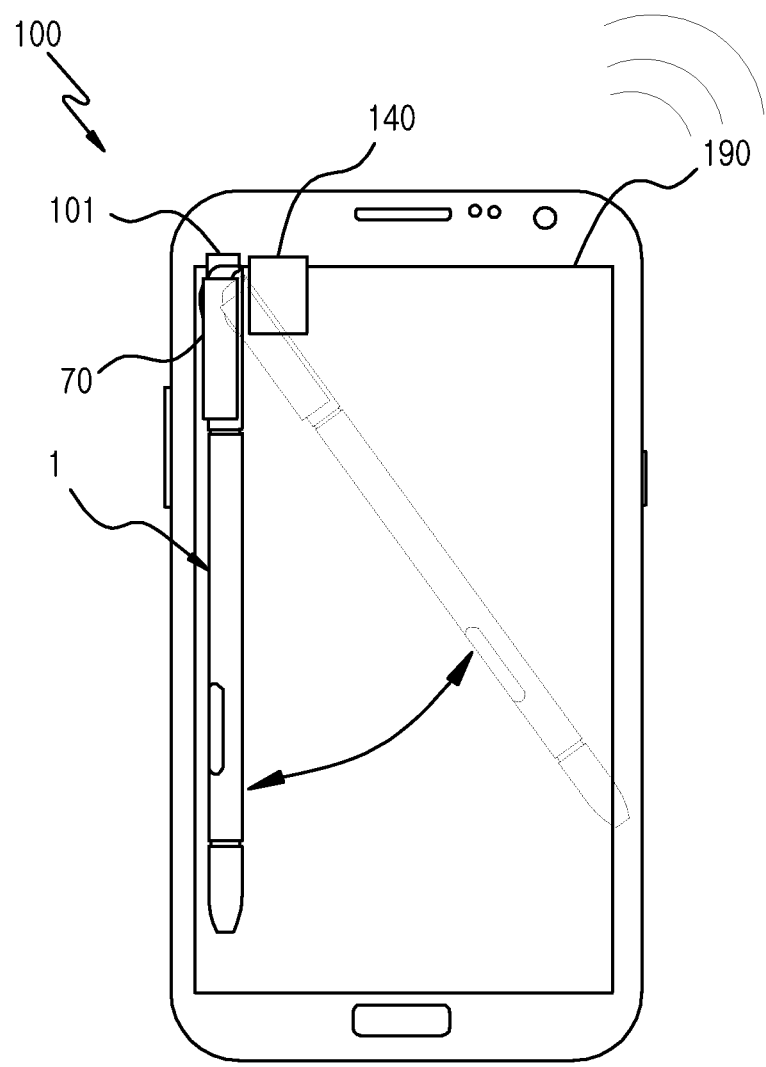
FIG. 7A illustrates a method of controlling a touch screen according to one example embodiment.
Figure 7B:
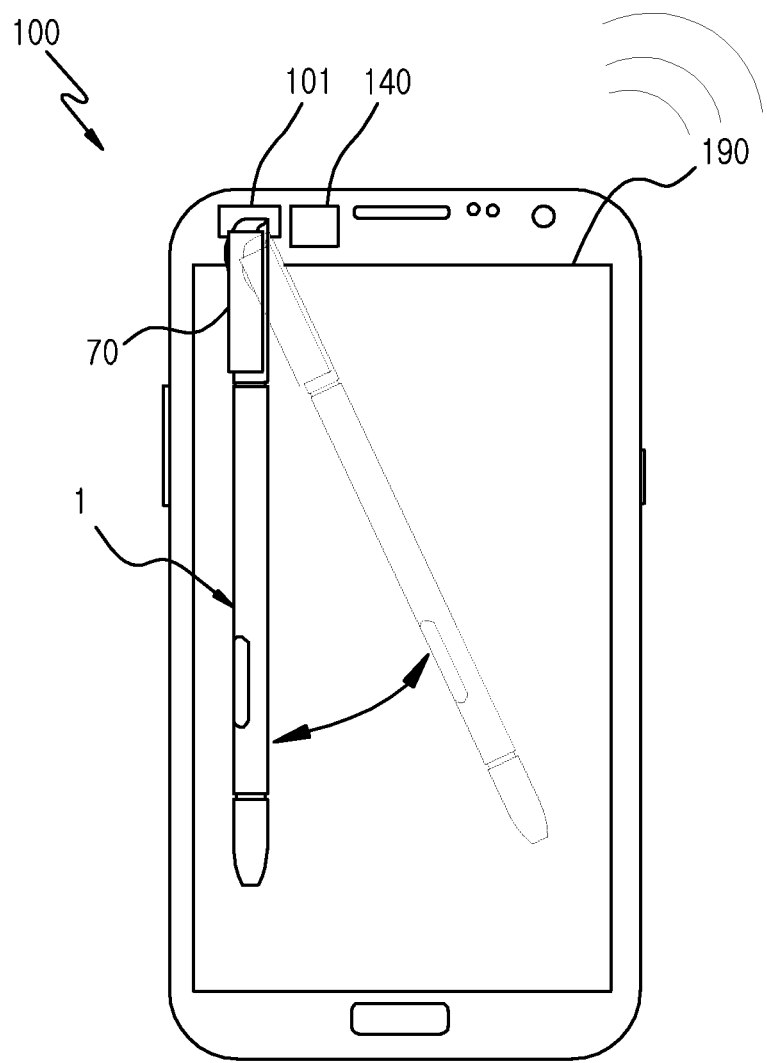
FIG. 7B illustrates a method of controlling a touch screen according to one example embodiment.

FIGS. 7A and 7B illustrate a method of controlling a touch screen according to one example embodiment.

Referring to FIG. 7A and FIG. 7B, according to various exemplary embodiments of the present invention, an input pen 1 can be attached to a metal member 101 as described above. The attachment of the input pen 1 can be detected by a sensor unit 140 as described above.

According to some example embodiments, if at least one part of the input pen 1 is placed on a touch screen 190, a magnetic signal's strength of the input pen 1 can be detected.

In addition, a horizontal level of the input pen 1 can be detected by using at least one of a gyro sensor and a geomagnetic sensor included in the input pen 1.

According to some example embodiments, if a gyro-equipped object moves in a rotary motion and thus precession occurs, a rotation repulsive-force is generated in the gyro, and the gyro sensor can measure the force and generate an electric signal in proportion to the measured value.

According to various exemplary embodiments, the geomagnetic sensor can detect a magnetic field and detect an inclination of the input pen 1.

According to various exemplary embodiments, the electronic device 100 can perform a corresponding function upon detection of a horizontal state and/or attachment of the input pen 1. The corresponding function can include, for example, powering off the touch screen 190 and transitioning the touch screen 190 to a locking state.

Figure 8:
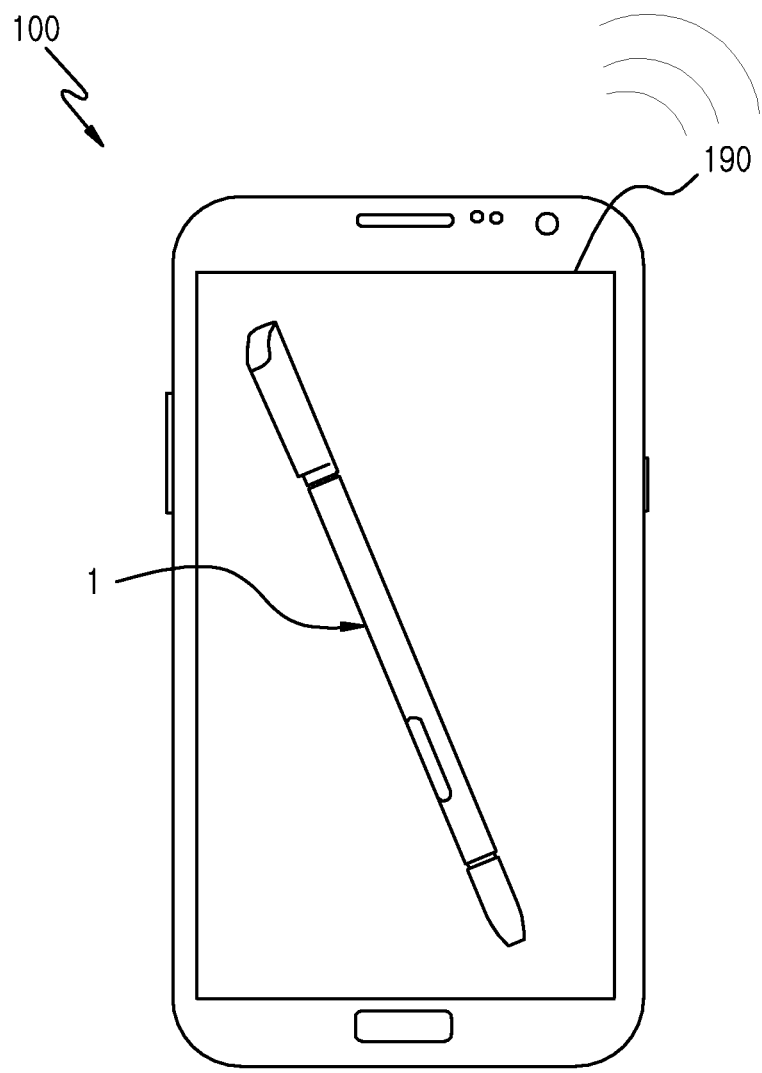
FIG. 8 illustrates a method of controlling a touch screen according to various example embodiments of the present invention.

FIG. 8 illustrates a method of controlling a touch screen according to an example embodiment.

Referring to FIG. 8, according to some example embodiments, an input pen 1 is not attached to an electronic device 100 but is placed on a touch screen 190. In this case, as described above, the electronic device 100 can detect a change in a magnetic signal's strength of the input pen 1.

According to various exemplary embodiments, the electronic device 100 can perform a corresponding function if an angle between the input pen 1 and the touch screen 190 is less than a specific angle. The corresponding function can include, for example, powering off the touch screen 190 and transitioning the touch screen 190 to a locking state.

Figure 9:
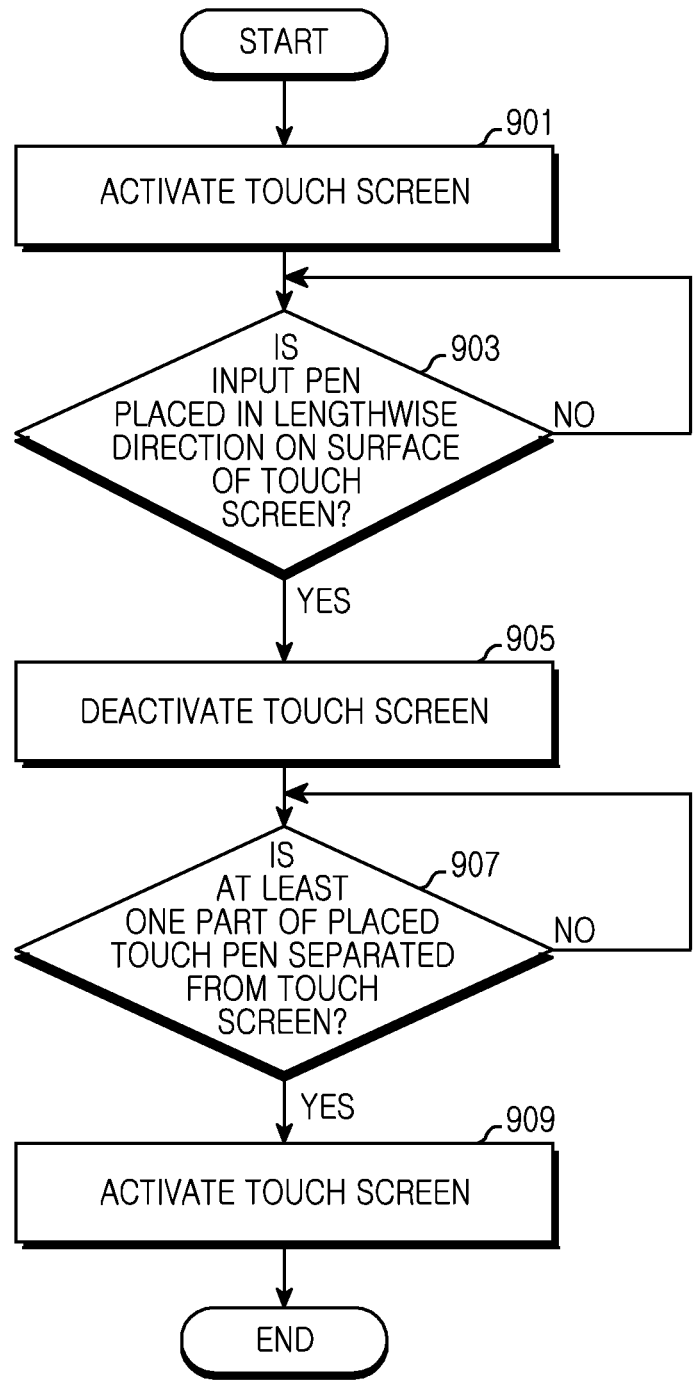
FIG. 9 is a flowchart illustrating an example sequence of steps for controlling a touch screen according to various example embodiments.

FIG. 9 is a flowchart illustrating an example sequence of steps for controlling a touch screen according to various example embodiments.

Referring to FIG. 9, the electronic device 100 activates the touch screen 190 in step 901. For example, the electronic device 100 can power ON the touch screen 190, or can activate the touch screen 190 by releasing a lock of the touch screen 190. Such an activation state may include a state where a user input can be made to the touch screen 190.

In step 903, the electronic device 100 determines whether the input pen 1 is placed in a lengthwise direction on the screen of the touch screen 190. For example, at least one magnet detected by a magnetic force detecting sensor of the electronic device 100 can be disposed at a first location, and an electromagnetic induction generating member detected by an electromagnetic induction detecting panel of the electronic device 100 can be included at a second location of the input pen 1. Therefore, if the electronic device 100 detects both of the magnet and the electromagnetic induction generating member which are disposed to the input pen 1, it can be determined that the input pen 1 is placed in the lengthwise direction on the surface of the touch screen 190

If it is determined that the input pen 1 is placed in the lengthwise direction on the surface of the touch screen 190, the electronic device 100 deactivates the touch screen 190 in step 905. For example, the electronic device 100 can deactivate the touch screen 190 by performing at least one of an operation of powering OFF the touch screen 190, an operation of setting a lock of the touch screen 190, an operation of decreasing the brightness of the touch screen 190, and an operation of ignoring the input to the touch screen 190.

In step 907, the electronic device 100 determines whether at least one part of the placed input pen 1 is separated from the touch screen 190. For example, the electronic device 100 may determine that the at least one part of the input pen 1 is separated from the touch screen 190 when detection of at least one of the magnet and the electromagnetic induction generating member which are disposed to the input pen 1 is released.

If it is determined that the at least one part of the placed input pen 1 is separated from the touch screen 190, the electronic device 100 activates the touch screen in step 909. For example, the electronic device 100 can activate the touch screen 190 by performing at least one of an operation of powering ON the touch screen 190, an operation of releasing the lock of the touch screen 190, an operation of increasing the brightness of the touch screen 190, and an operation for receiving the input to the touch screen 190.

Thereafter, the procedure of FIG. 9 ends.

An instruction set for each of the above steps can be stored in the memory as one or more modules. In this case, a module stored in the memory can be executed by one or more processors 112.

Before describing various example embodiments below, since the following description is significantly similar to the aforementioned description in many senses, it should be understood that some alternative embodiments may not be described in detail.

Figure 10:
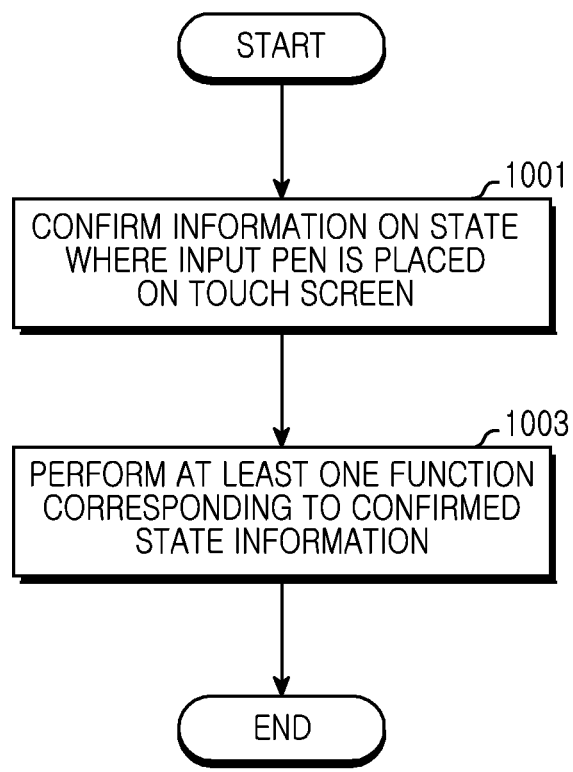
FIG. 10 is a flowchart illustrating an example sequence of steps for touch screen according to various example embodiments.

FIG. 10 is a flowchart illustrating an example sequence of steps for controlling a touch screen according to various example embodiments.

Referring to FIG. 10, the electronic device 100 confirms information on a state where the input pen 1 is placed on the touch screen 190 in step 1001. According to one exemplary embodiment, the electronic device 100 can determine a state where the input pen 1 is completely laid in a lengthwise direction on the screen of the touch screen 190. For example, at least one magnet detected by a magnetic force detecting sensor of the electronic device 100 can be disposed at a first location, and an electromagnetic induction generating member detected by an electromagnetic induction detecting panel of the electronic device 100 can be included at a second location of the input pen 1. If the electronic device 100 detects both of the magnet disposed to the input pen 1 and the electromagnetic induction generating member, it can be determined that the input pen 1 is placed in the lengthwise direction on the surface of the touch screen 190.

According to one exemplary embodiment, the electronic device 100 can confirm an angle at which the input pen 1 stands upright on the surface of the touch screen 190. For example, the electromagnetic induction generating member is included in one side of the input pen 1, and the electronic device 100 can confirm the angle at which the input pen 1 stands upright on the surface of the touch screen 190 by detecting a change in strength of a magnetic signal of the input pen 1. However, the present invention is not limited thereto, and thus the electronic device 100 can confirm information on various states in which the input pen 1 is placed on the touch screen 190.

In step 1003, the electronic device 100 performs at least one function corresponding to the confirmed state information. For example, according to the confirmed state information, the electronic device 100 can regulate brightness of the screen, regulate a volume, reconfigure a UI displayed on the screen, drive an application, or start a specific event. However, the present invention is not limited thereto, and thus various functions corresponding to the state information may further exist.

Thereafter, the procedure of FIG. 10 ends.

Figure 11:
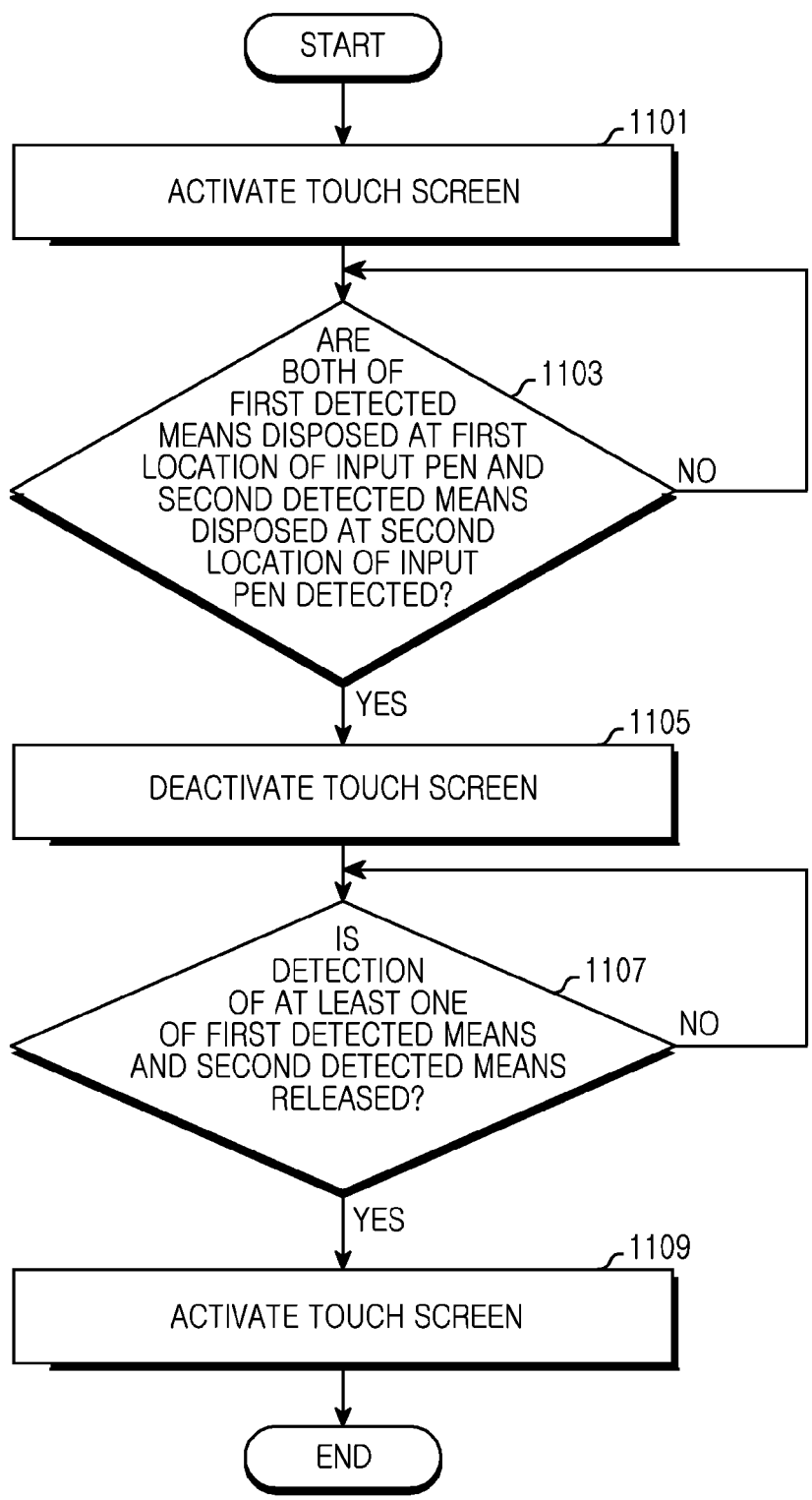
FIG. 11 is a flowchart illustrating an example sequence of steps for touch screen according to various example.

FIG. 11 is a flowchart illustrating an example sequence of steps for controlling a touch screen according to one example embodiment.

Referring to FIG. 11, the electronic device 100 activates the touch screen 190 in step 1101. For example, the electronic device 100 can power ON the touch screen 190, or can activate the touch screen 190 by releasing a lock of the touch screen 190. Such an activation state may include a state where a user input can be made to the touch screen 190.

In step 1103, the electronic device 100 determines whether both of a first detected means disposed at a first location of the input pen 1 and a second detected means disposed at a second location of the input pen 1 are detected. For example, at least one magnet detected by a magnetic force detecting sensor of the electronic device 100 can be disposed at the first location, and an electromagnetic induction generating member detected by an electromagnetic induction detecting panel of the electronic device 100 can be included at the second location of the input pen 1.

Upon detection of both of the first detected means and the second detected means, the electronic device 100 deactivates the touch screen 190 in step 1105. For example, the electronic device 100 can deactivate the touch screen 190 by performing at least one of an operation of powering OFF the touch screen 190, an operation of setting a lock of the touch screen 190, an operation of decreasing the brightness of the touch screen 190, and an operation of ignoring the input to the touch screen 190.

In step 1007, the electronic device 100 determines whether detection of at least one of the first detected means and the second detected means is released. For example, the electronic device 100 may determine whether the detection of the at least one of the magnet and the electromagnetic induction generating member which are disposed to the input pen 1 is released.

If the detection of the at least one of the first detected means and the second detected means is released, the electronic device 100 activates the touch screen 190 in step 1109. For example, the electronic device 100 can activate the touch screen 190 by performing at least one of an operation of powering ON the touch screen 190, an operation of releasing the lock of the touch screen 190, an operation of increasing the brightness of the touch screen 190, and an operation for receiving the input to the touch screen 190.

Thereafter, the procedure of FIG. 11 ends.

Figure 12:
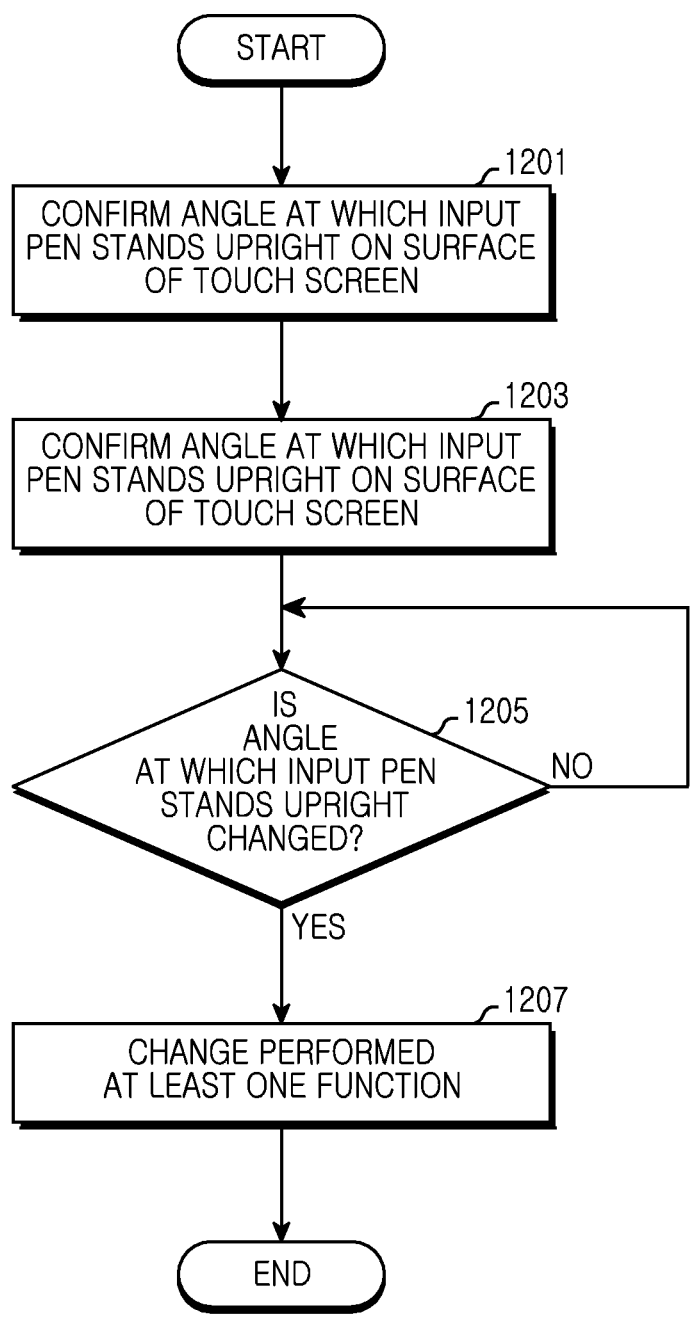
FIG. 12 is a flowchart illustrating an example sequence of steps for controlling a touch screen according to various example.

FIG. 12 is a flowchart illustrating an example sequence of steps for controlling a touch screen according to various example embodiments.

Referring to FIG. 12, the electronic device 100 confirms an angle at which the input pen 1 stands upright on the surface of the touch screen 190 in step 1201. For example, the electromagnetic induction generating member is included in one side of the input pen 1, and the electronic device 100 can confirm the angle at which the input pen 1 stands upright on the surface of the touch screen 190 by detecting a change in strength of a magnetic signal of the input pen 1.

In step 1203, the electronic device 100 performs at least one function based on the confirmed angle. For example, according to the confirmed angle, the electronic device 100 can regulate brightness of the screen, regulate a volume, reconfigure a UI displayed on the screen, drive an application, or start a specific event. However, the present invention is not limited thereto, and thus various functions corresponding to the confirmed angle may further exist.

In step 1205, the electronic device 100 determines whether there is a change in the angle at which the input pen 1 stands upright. For example, if the input pen 1 moves, a location of the input pen 1 may change, and the angle at which the input pen 1 stands upright may also change.

When there is the change in the angle at which the input pen 1 stands upright, the electronic device 100 changes the performed at least one function in step 1207. For example, the electronic device 100 can change brightness of the screen, change a volume, reconfigure a UI displayed on the screen, drive an application, or start a specific event.

Thereafter, the procedure of FIG. 12 ends.

Figure 13:
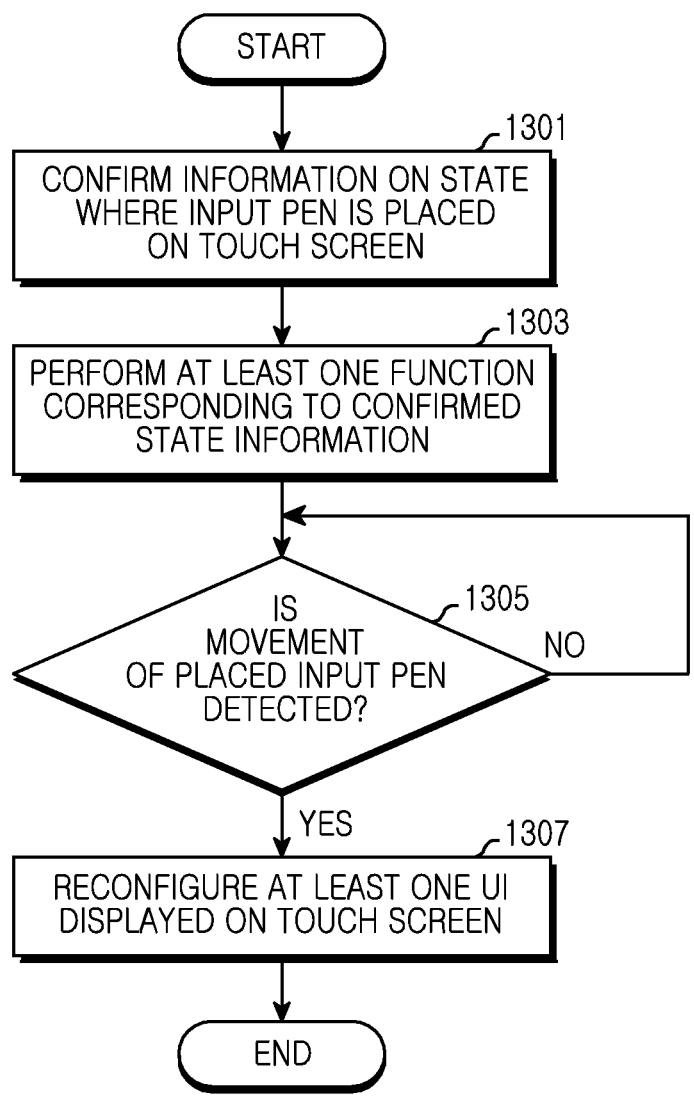
FIG. 13 is a flowchart illustrating an example sequence of steps for touch screen according to various example.

FIG. 13 is a flowchart illustrating an example sequence of steps controlling a touch screen according to various example embodiments.

Referring to FIG. 13, the electronic device 100 confirms information on a state where the input pen 1 is placed on the touch screen 190 in step 1301. According to one exemplary embodiment, the electronic device 100 can determine a state where the input pen 1 is completely laid in a lengthwise direction on the screen of the touch screen 190. For example, at least one magnet detected by a magnetic force detecting sensor of the electronic device 100 can be disposed at a first location, and an electromagnetic induction generating member detected by an electromagnetic induction detecting panel of the electronic device 100 can be included at a second location of the input pen 1. If the electronic device 100 detects both of the magnet disposed to the input pen 1 and the electromagnetic induction generating member, it can be determined that the input pen 1 is placed in the lengthwise direction on the surface of the touch screen 190.

According to one exemplary embodiment, the electronic device 100 can confirm an angle at which the input pen 1 stands upright on the surface of the touch screen 190. For example, the electromagnetic induction generating member is included in one side of the input pen 1, and the electronic device 100 can confirm the angle at which the input pen 1 stands upright on the surface of the touch screen 190 by detecting a change in strength of a magnetic signal of the input pen 1. However, the present invention is not limited thereto, and thus the electronic device 100 can confirm information on various states in which the input pen 1 is placed on the touch screen 190.

In step 1303, the electronic device 100 performs at least one function corresponding to the confirmed state information. For example, according to the confirmed state information, the electronic device 100 can regulate brightness of the screen, regulate a volume, reconfigure a UI displayed on the screen, drive an application, or start a specific event. However, the present invention is not limited thereto, and thus various functions corresponding to the state information may further exist.

In step 1305, the electronic device 100 detects a movement of the placed input pen 1. For example, the electronic device 100 can confirm that the input pen 1 is idle, and can confirm that the location of the input pen 1 changes.

Upon detection of the movement of the placed input pen 1, the electronic device 100 reconfigures at least one UI displayed on the touch screen 190 in step 1307. For example, the electronic device 100 can move the at least one UI by avoiding an area of the input pen 1 placed on the touch screen 190. For another example, the electronic device 100 can move the at least one UI to an area hidden by the area of the input pen 1. However, the present invention is not limited thereto, and thus the at least one UI can move to a designated area.

Thereafter, the procedure of FIG. 13 ends.

Methods based on the embodiments disclosed in the claims and/or specification of the present invention can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in an electronic device. The one or more programs include instructions for allowing the electronic device to execute the methods based on the embodiments disclosed in the claims and/or specification of the present invention.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wireless LAN (WLAN), or a Storage Area Network (SAN) or a communication network configured by combining the networks. The storage device can access via an external port to the electronic device.

In addition, an additional storage unit on a communication network can access to a portable electronic device.

The example embodiments should be considered as descriptive only and not limiting. It is to be noted that various changes in form may be made without departing from the concept of the invention as defined by the disclosure and the appended claims. Therefore, as long as such changes and modification are apparent to those skilled in the art, they are to be understood as included as part of the apparatus and method described herein.

By performing at least one function according to information on a state where an input pen is placed on a touch screen, the input pen can be prevented from being lost when the input pen is not used, and power required for a display can be saved. Further, a service that can be associated with the input pen, for example, a reconfiguration of a user interface displayed on a screen, can be provided.

CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A method for controlling an electronic device using an electronic pen, the method comprising:
   detecting whether at least a portion of the electronic pen is laid on a touch screen of the electronic device;
   detecting whether a first portion of the electronic pen is attached to the electronic device;
   detecting whether a first movement of the electronic pen is detected, while the at least a portion of the electronic pen is laid on the touch screen and a first portion of the electronic pen is attached to the electronic device; and
   performing, in response to the first movement of the electronic pen, a preset function.

2. The method of claim 1, wherein the detecting whether the at least the portion of the electronic pen is laid on the touch screen of the electronic device comprises detecting a state where the electronic pen is completely laid in a lengthwise direction on a surface of the touch screen.

3. The method of claim 2, wherein the detecting whether the first portion of the electronic pen is attached to the electronic device comprises detecting a first detected means disposed at the first portion of the electronic pen,
   wherein detecting whether the at least portion of the electronic pen is laid on the touch screen of the electronic device comprises detecting a second detected means disposed at a second portion of the electronic pen.

4. The method of claim 3, further comprising, upon detection of both of the first detected means and the second detected means, deactivating the touch screen.

5. The method of claim 4, wherein the deactivating of the touch screen comprises at least one of powering OFF the touch screen, setting a lock of the touch screen, decreasing a brightness of the touch screen, and ignoring an input to the touch screen.

6. The method of claim 4, further comprising, if detection of at least one of the first detected means and the second detected means is released, activating the touch screen.

7. The method of claim 3,
wherein the first detected means is at least one magnet detected by a magnetic force detecting sensor, and
wherein the second detected means is an electromagnetic induction generating member detected by an electromagnetic induction detecting panel.

8. The method of claim 2, further comprising:
upon confirming a state where the electronic pen is placed on the touch screen, confirming a second movement of the electronic pen; and
performing a corresponding function based on the second movement of the electronic pen.

9. The method of claim 8, wherein the confirming of the movement of the electronic pen comprises confirming that the electronic pen is idle or confirming that a location of the electronic pen changes.

10. The method of claim 9, further comprising, if the location of the electronic pen changes, reconfiguring at least one user interface (UI) displayed on the touch screen.

11. The method of claim 10, wherein the reconfiguring of the UI comprises moving the UI by avoiding an area of the electronic pen placed on the touch screen or moving the UI to an area hidden by the electronic pen.

12. The method of claim 1, further comprising confirming an angle at which the electronic pen stands upright on a surface of the touch screen.

13. The method of claim 12, further comprising, when the angle at which the electronic pen stands upright changes, changing the at least one function.

14. The method of claim 1, wherein the preset function comprises at least one of regulating brightness of the screen, regulating a volume, reconfiguring a UI, driving an application, and starting a specific event.

15. An electronic device using an electronic pen comprising:
a touch screen; and
at least one processor for detecting whether at least a portion of the electronic pen is laid on the touch screen of the electronic device, for detecting whether a first portion of the electronic pen is attached to the electronic device, for detecting whether a first movement of the electronic pen is detected, while the at least portion of the electronic pen is laid on the touch screen and the first portion of the electronic pen is attached to the electronic device, and performing, in response to the first movement of the electronic pen, a preset function.

16. The electronic device of claim 15, wherein the processor detects a state where the electronic pen is completely laid in a lengthwise direction on a surface of the touch screen.

17. The electronic device of claim 16, wherein the processor detects a first detected means disposed at the first portion of the electronic pen, and detects a second detected means disposed at a second portion of the electronic pen.

18. The electronic device of claim 17, wherein upon detection of both of the first detected means and the second detected means, the processor deactivates the touch screen.

19. The electronic device of claim 18, wherein the processor deactivates the touch screen by performing at least one of an operation of powering OFF the touch screen, an operation of setting a lock of the touch screen, an operation of decreasing a brightness of the touch screen, and an operation of ignoring the electronic to the touch screen.

20. The electronic device of claim 18, wherein if detection of at least one of the first detected means and the second detected means is released, the processor activates the touch screen.

* * * * *

UNITED STATES PATENT AND TRADEMARK OFFICE
CERTIFICATE OF CORRECTION

| | | |
|---|---|---|
| PATENT NO. | : 9,310,898 B2 | Page 1 of 1 |
| APPLICATION NO. | : 14/230292 | |
| DATED | : April 12, 2016 | |
| INVENTOR(S) | : Sung-Ho Son et al. | |

It is certified that error appears in the above-identified patent and that said Letters Patent is hereby corrected as shown below:

In the Claims

Column 18, Claim 19, Line 29 should read as follows:
--…electronic pen input to…--

Signed and Sealed this
Thirty-first Day of May, 2016

Michelle K. Lee
*Director of the United States Patent and Trademark Office*